(12) United States Patent
Kokkinos et al.

(10) Patent No.: US 9,277,590 B2
(45) Date of Patent: Mar. 1, 2016

(54) ACTIVE ANTENNA ARRAYS

(75) Inventors: Titos Kokkinos, Baden-Wurttemberg (DE); Florian Pivit, Dublin (IE)

(73) Assignee: Alcatel Lucent, Boulogne-Billancourt (FR)

( * ) Notice: Subject to any disclaimer, the term of this patent is extended or adjusted under 35 U.S.C. 154(b) by 141 days.

(21) Appl. No.: 13/984,361

(22) PCT Filed: Jan. 26, 2012

(86) PCT No.: PCT/EP2012/000346
§ 371 (c)(1),
(2), (4) Date: Oct. 21, 2013

(87) PCT Pub. No.: WO2012/107176
PCT Pub. Date: Aug. 16, 2012

(65) Prior Publication Data
US 2014/0036777 A1    Feb. 6, 2014

(30) Foreign Application Priority Data

Feb. 11, 2011    (EP) .................................... 11290083

(51) Int. Cl.
| | |
|---|---|
| *H04W 88/10* | (2009.01) |
| *H04B 7/02* | (2006.01) |
| *H01Q 1/24* | (2006.01) |
| *H01Q 21/06* | (2006.01) |
| *H04B 1/00* | (2006.01) |
| *H01Q 5/50* | (2015.01) |

(52) U.S. Cl.
CPC ............... *H04W 88/10* (2013.01); *H01Q 1/246* (2013.01); *H01Q 5/50* (2015.01); *H01Q 21/06* (2013.01); *H04B 1/0057* (2013.01)

(58) Field of Classification Search
None
See application file for complete search history.

(56) References Cited

U.S. PATENT DOCUMENTS

| | | | |
|---|---|---|---|
| 3,518,695 | A | 6/1970 | Schroeder |
| 6,043,790 | A | 3/2000 | Derneryd et al. |
| 6,448,938 | B1 | 9/2002 | Chiang et al. |
| 7,064,710 | B1 | 6/2006 | Ksienski et al. |
| 7,230,570 | B2 | 6/2007 | Thomas et al. |

(Continued)

FOREIGN PATENT DOCUMENTS

| | | |
|---|---|---|
| CN | 2514507 | 10/2002 |
| CN | 1539178 | 10/2004 |

(Continued)

OTHER PUBLICATIONS

International Search Report for PCT/EP2012/000346 dated May 21, 2012.

(Continued)

*Primary Examiner* — Duc Duong
(74) *Attorney, Agent, or Firm* — Fay Sharpe LLP

(57) ABSTRACT

In order to reduce the weight, cost and complexity of an active antenna array, designed for use with a plurality of different mobile telecommunications systems (multi-band system), the array comprises a plurality of antenna elements, which are divided into a plurality of antenna groups; a plurality of RF transceivers, which are divided into transceiver sets, wherein each transceiver of a set is arranged to operate on a different mobile telecommunications system, and including respective phase shifting and feeding networks coupled between each transceiver set and a respective antenna group, so that each transceiver of a set is coupled to each antenna element of the respective antenna group.

11 Claims, 7 Drawing Sheets

(56) References Cited

U.S. PATENT DOCUMENTS

| | | |
|---|---|---|
| 2004/0204109 A1 | 10/2004 | Hoppenstein |
| 2004/0252055 A1 | 12/2004 | Thomas et al. |
| 2005/0281220 A1 | 12/2005 | Stanwood et al. |
| 2008/0102760 A1 | 5/2008 | McConnell et al. |
| 2008/0204318 A1 | 8/2008 | Thomas et al. |
| 2008/0258993 A1* | 10/2008 | Gummalla et al. ............ 343/876 |
| 2009/0209265 A1* | 8/2009 | Kwon .................. H04W 16/14 455/454 |
| 2011/0299456 A1* | 12/2011 | Schmidt ................. H01Q 1/246 370/328 |
| 2011/0310881 A1* | 12/2011 | Kenington .................... 370/350 |
| 2012/0083216 A1* | 4/2012 | Kenington ............... H04B 1/52 455/63.1 |
| 2012/0142280 A1* | 6/2012 | Banu .................... H04B 7/0682 455/69 |
| 2012/0194385 A1* | 8/2012 | Schmidt et al. ............... 342/368 |
| 2012/0196545 A1* | 8/2012 | Schmidt et al. ................. 455/73 |
| 2013/0044650 A1* | 2/2013 | Barker et al. ................. 370/278 |

FOREIGN PATENT DOCUMENTS

| | | |
|---|---|---|
| CN | 1586023 | 2/2005 |
| JP | H 11 17446 | 1/1999 |
| JP | 2001-518265 | 10/2001 |
| JP | 2005-522062 | 7/2005 |
| JP | 2008-503942 | 2/2008 |
| WO | WO 02/07254 | 1/2002 |
| WO | WO 02/07254 A1 | 1/2002 |
| WO | WO 03/036756 | 5/2003 |

OTHER PUBLICATIONS

"Opposition against European Patent No. EP 2 487 800 B1, Active Antenna Array, held by Alcatel Lucent, Paris, France", Filed by Kathrein-Werke, KG, Mar. 19, 2014.

Rathgeber, Roland, et al., "Smart-RF Project—Antenna and Filter Solutions", Antenna & Filter Research, Ru, RR Jun. 2010.

SDR-Forum, 2010 European Conference, 2010_Agenda.

Gabriel, R., et al.. "Antennas and Filters in a Broadband and Frequency Agnostic World", T-Mobile Technology Symposium, May 11, 2006.

T-Mobile Technology Symposium on Multi-Band and Multi Standard Implementation in Mobile Communication Systems, May 11, 2006, Agenda.

Alcatel-Lucent, Active Antenna Arrays, Bell Labs Research Report, Alcatel-Lucent Innovation Days, Dec. 2008.

Wikipedia, the free encyclopedia, "Passive Electronically Scanned Array", p. 1.

Wikipedia, the free encyclopedia, "Active Electronically Scanned Array", p. 1.

Wikipedia, the free encyclopedia, "Smart antenna", p. 1.

* cited by examiner

ACTIVE ANTENNA ARRAYS

FIELD OF THE INVENTION

The present invention relates to active antenna arrays for mobile telecommunications systems.

BACKGROUND ART

Active Antenna Arrays (AAA), otherwise known as smart antennas, have recently gained popularity as candidate technology for base stations (BS) of future cellular/mobile networks. In the context of AAA, each radiator of the BS antenna array is fed by a dedicated RF transceiver /RF front-end, as shown in FIG. 1. In FIG. 1, a base station 2 has an active antenna array comprising a series of N antenna elements 41 . . . 4N, each being coupled to a respective RF transceiver 61 . . . 6N. Typically each RF transceiver comprises a transmit path which includes a digital to analog converter DAC, a frequency up-conversion stage and a power amplifier PA, and a receive path which includes a low noise amplifier, a frequency down-conversion stage and an analog to digital converter ADC. Appropriate phase shifts are applied, either in the transceivers, or in baseband signal processing, to the transmit and receive paths of the array in order to "steer" the antenna beam.

Current and future base stations may be required to support different mobile telecommunication systems, e.g. 2G (e.g. GSM), 3G (e.g. WCDMA) or 4G (e.g. LTE), operating on different frequencies, which may be in a range from 400 MHz to 2.6 GHz. This might require separate antenna array configurations for each system, which is clearly costly and generally inconvenient

SUMMARY OF THE INVENTION

The present invention provides an active antenna array, adapted for use with a plurality of different mobile telecommunications systems, comprising:

a plurality of antenna elements, which are divided into a plurality of antenna groups;

a plurality of transceivers, which are divided into a plurality of transceiver groups equal in number to said plurality of different systems, each transceiver group being adapted to operate on a respective mobile telecommunications system of said plurality of different systems, and including a feeding and phase shifting network coupled between said transceivers and said antenna elements, whereby, for each said antenna group, a member of each said transceiver group is selectively coupled to antenna elements thereof.

As preferred, the transceivers are additionally formed into a plurality of transceiver sets, each set comprising a member from each said transceiver group, and each antenna group is coupled to a respective transceiver set.

In another aspect, the invention provides an active antenna array, adapted for use with a plurality of different mobile telecommunications systems, comprising:

a plurality of antenna elements, which are divided into a plurality of antenna groups, each group comprising more than one antenna element;

a plurality of transceivers, which are divided into a plurality of transceiver sets, wherein each transceiver of a transceiver set is adapted to operate on a respective mobile telecommunications system of said plurality of different systems;

and a feeding and phase shifting network, wherein each transceiver set is coupled through the phase shifting network to a respective antenna group, whereby at least one transceiver of the transceiver set is selectively coupled to antenna elements of the respective antenna group.

In at least an embodiment of the invention, the efficient design of multi-band (multi-band is the commonly used term for multiple mobile telecommunication systems) active antenna arrays (AAA) is based on the fact that the total number of RF transceivers required for the synthesis of multi-band AAA can be reduced by employing one transceiver of each band/system to feed multiple antenna elements through either a passive or an active feeding network. Therefore an advantage arises in that the amount of hardware, weight, cost and complexity required for an AAA to operate with different mobile telecommunications systems can be reduced where RF transceivers of each band of the AAA coupled to the antenna elements are not allocated on a one to one basis, but instead a phase shifting and feeding (multiplexing/demultiplexing) network is provided so that each transceiver is coupled to more than one antenna element. Although this may result in some diminution in quality in some situations, it has been found that in the majority of practical situations encountered, a diminution in quality is not significant.

In an embodiment, said phase shifting network is arranged such that for each antenna group, a member of each transceiver set is coupled to each antenna element of the antenna group via respective phase shifting elements.

In one embodiment, the total number of transceiver elements is equal to the total number of antenna elements, because of commonly used configurations of such arrays. However in other embodiments, different numbers may be employed. It is preferred however that the total number of antenna elements should be an exact multiple of the number of transceiver sets so that each transceiver set is multiplexed to the same number of antenna elements.

In further embodiments one or more transceivers of a transceiver set may be decoupled from one or more antenna elements of the respective antenna group.

In common situations, the number of different of mobile systems to be serviced may be 2 (dual-band) or 3 (tri-band). The systems serviced may be of any type in use or envisaged, e.g. GSM (2G), UMTS (WCDMA, 3G) and LTE (4G). These systems may have operating frequencies in a wide frequency range, for example for as low as 400 MHz to approaching 3 GHz. Since it is difficult to devise a single antenna device that can operate satisfactorily over such a large frequency range, it may be possible in accordance with the invention to have each antenna element comprising more than one antenna sub-element, each sub-element operating on a different part of the anticipated frequency range. However in accordance with an embodiment, it is preferred to have each antenna element formed as a single device which is sufficiently wideband to cover a significant part of the total possible frequency range. As preferred, it is proposed to have a first embodiment having antenna elements which are responsive to frequencies between about 400 MHz and 1500 MHz. In another embodiment, higher frequencies between about 1.6 GHz and 2.7GHz are covered by a single antenna element, which range includes 1.8, 1.9 GHz (GSM), 2.1 GHz (WCDMA), and 2.7 GHz for 4G systems such as LTE.

Said phase shifting network(s) may be divided into downlink paths coupled to transceiver transmit paths, and uplink paths, coupled to the transceiver receive paths. The downlink path may comprise power dividers in a transmit path, coupled to each transceiver, for splitting the power from each transceiver. These are normally passive devices such as Wilkinson power dividers. Multiplexing units, which are also passive devices, may be connected to the inputs of the antenna elements and arranged for receiving inputs from various transceivers. The uplink path may include corresponding demultiplexing devices coupled to the antenna elements and power combiners coupled to the transceivers. The phase shifting devices, positioned between power dividers/combiners and multiplexing/demultiplexing units, may be passive devices or active devices. For high power applications, e.g. powers of the order of watts, passive devices are preferred since they have smaller losses. For example transmission lines of a certain length may be employed, which may be tunable, e.g. by having an adjustable dielectric filling. For low power application such as e.g. 250 mW, active devices such as integrated circuit phase shifting devices may be employed, which are tunable by means of an applied voltage. These devices have insertion losses, for example about 3 dB, which makes them unsuitable for high power applications.

The multiplexing/demultiplexing units may be different technologies such as ceramic-based, cavity-based or microstrip-based, selected in accordance with power requirements and the number of inputs required.

BRIEF DESCRIPTION OF THE DRAWINGS

Embodiments of the invention will now be described, by way of example only, with reference to the accompanying drawings, wherein.

DESCRIPTION OF AN EMBODIMENT

Figure 1:
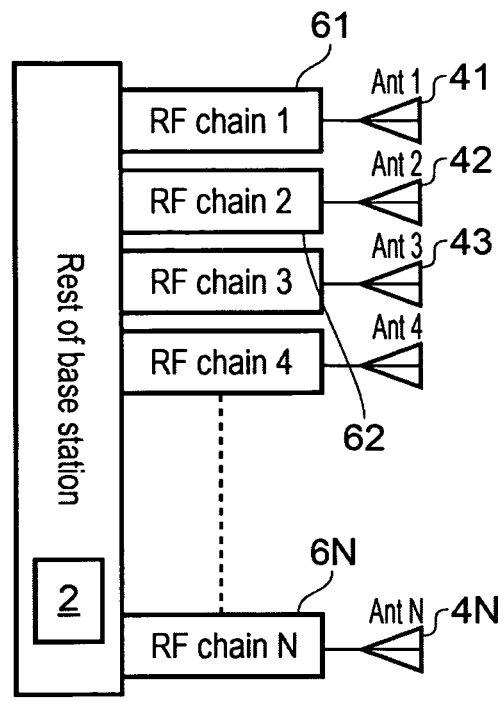
FIG. 1 is a diagram illustrating a known configuration of an active antenna array employed in a base station of a mobile telecommunications system.
Figure 2:
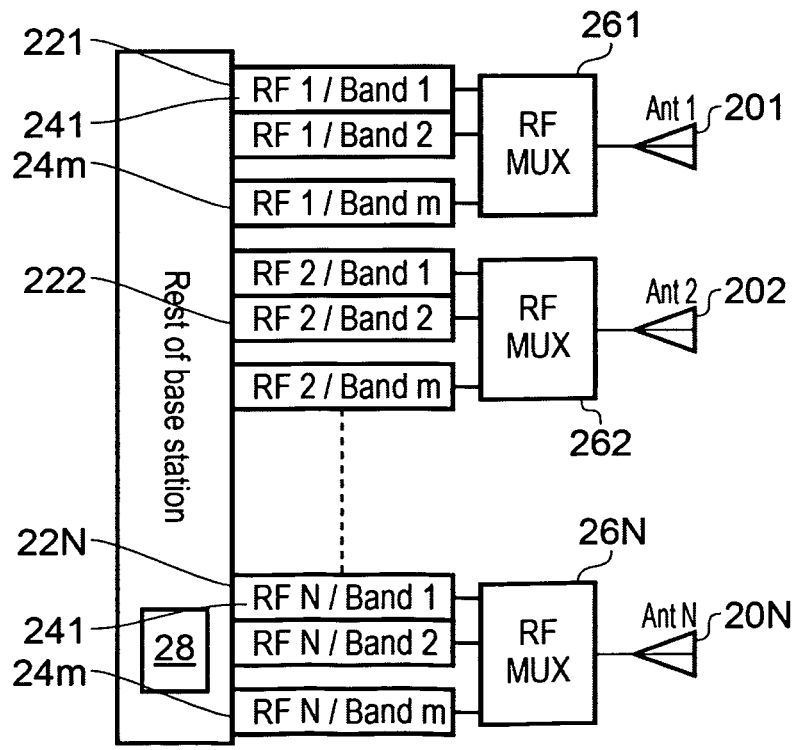
FIG. 2 is a diagram illustrating a configuration of an active antenna array employed in a base station, for the purpose of explaining the present invention, having a multi-band architecture.

A design of a multi-band (m-band) AAA BS is shown in FIG. 2, for explanation of this invention (in this specification the term "band" is used to denote a mobile telecommunications system, in accordance with common parlance). N antenna elements 201 . . . 20N are provided, the same number as in FIG. 1. Each antenna element is fed from a set 221 . . . 22N, each set comprising m dedicated RF front-ends (transceivers) 241 . . . 24m, each front-end designed to operate on a different band/system. Thus it may be seen that the total number of transceivers is also divided into m groups, each group operating on a respective system. Each feed set 221 . . . 22N is fed through a respective multiplexing network 261 . . . 26N to a respective antenna element 201 . . . 20N. The rest of the base station is indicated at 28.

Each transceiver 241 . . . 24m is commonly provided with a transmit path which includes a digital to analog converter DAC, a frequency up-conversion stage and a power amplifier PA, and a receive path which includes a low noise amplifier, a frequency down-conversion stage and an analog to digital converter ADC. Appropriate phase shifts are applied to the transmit and receive paths of the array in order to "steer" the antenna beam. However for the purposes of this specification, a "transceiver" will be understood to mean an RF unit which includes a receive path and/or a transmit path, with appropriate reception and/or transmission components.

In FIG. 2, each antenna element of the BS antenna array (usually in the form of a panel), is fed from m dedicated RF front-ends, each of them designed to operate at a different frequency band. In that case, the RF signals of each of the m RF front-ends 241 . . . 24m that feed the same antenna element 201 have to be multiplexed on an RF multiplexer 26i, and also the antenna element 20i has to be wideband enough so that all the m-bands are included in the antenna operating bandwidth.

The approach of FIG. 2 for the design of multi-band AAA has the main disadvantage that for the synthesis of an m-band, N-antenna element AAA, (m×N) RF front-ends are required. This increases significantly the cost of the BS, the complexity of it, and also its weight and volume. For all these reasons, more efficient architectures for multi-band AAA are preferred.

In the following Figures, similar parts to those of FIG. 2 are denoted by the same reference numerals.

Figure 3:
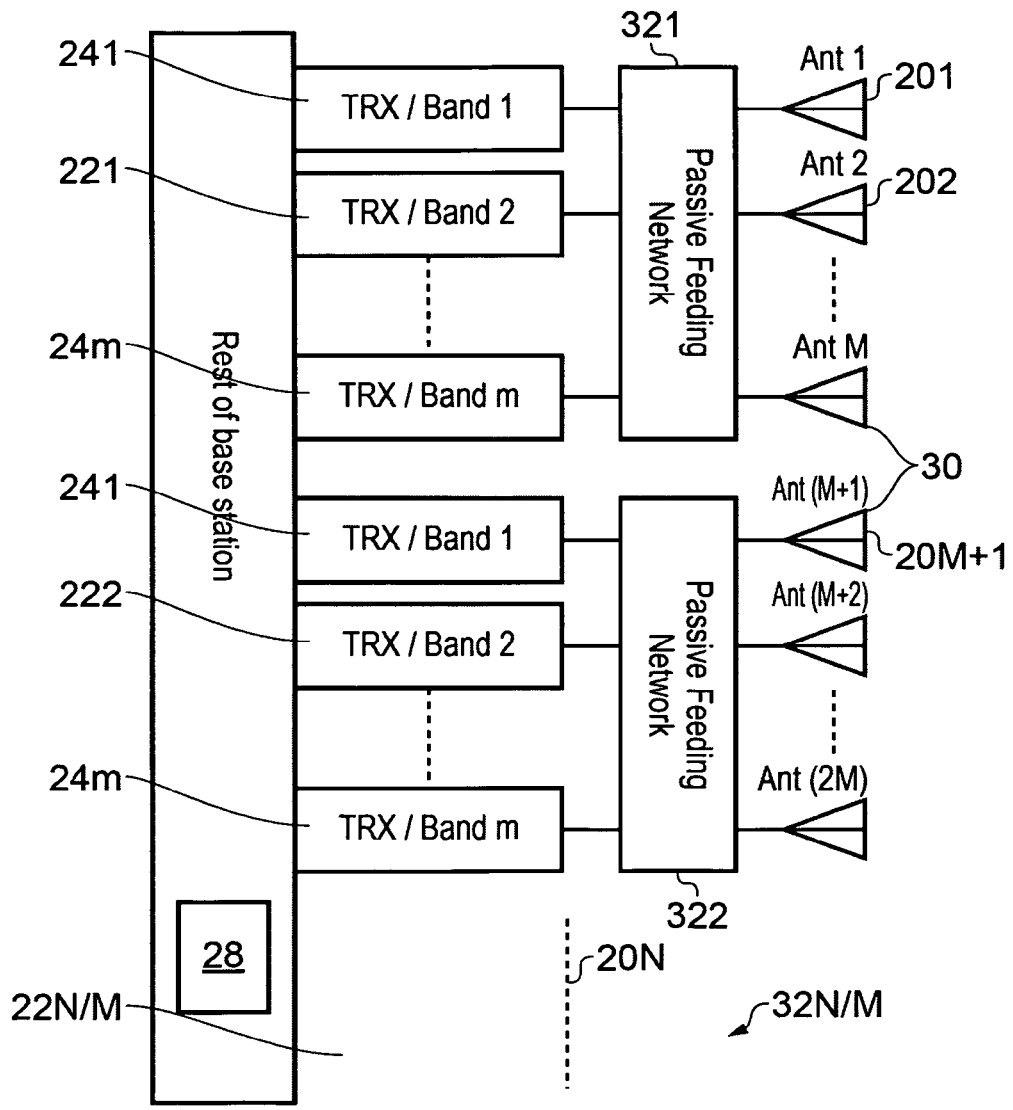
FIG. 3 is a schematic block diagram of a first embodiment of the invention, showing an architecture for multi-band AAA in which a Passive Feeding Network is employed.
Figure 4:
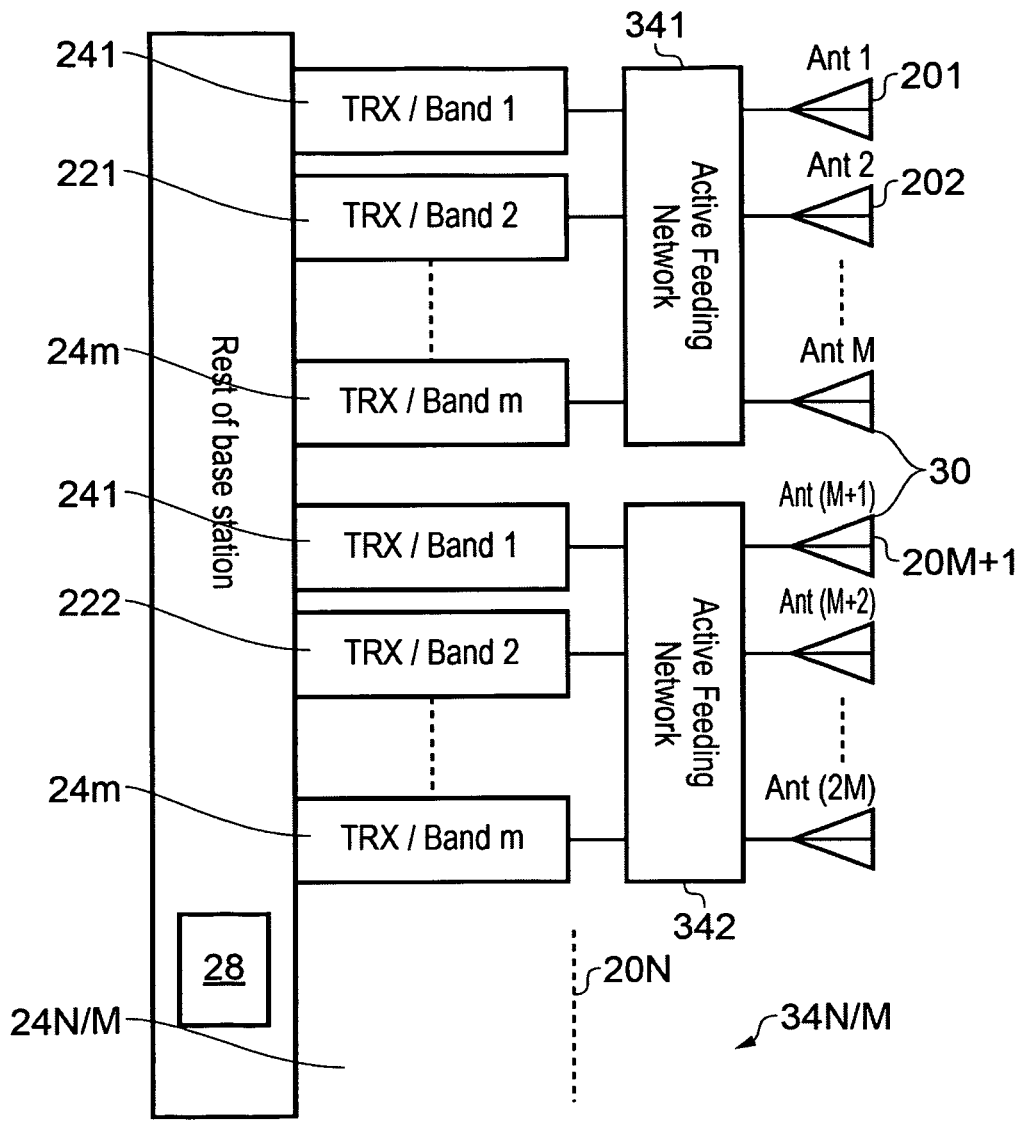
FIG. 4 is a schematic block diagram of a second embodiment of the invention, showing an architecture for multi-band AAA in which an Active Feeding Network is.

FIG. 3 is a schematic block diagram of a first embodiment of the invention, showing an architecture for multi-band AAA in which a respective Passive Feeding Network is employed, to distribute and multiplex/demultiplex the transmit/receive RF signals of m RF transceivers (each of them operating at a different band) to/from M wideband antenna elements. FIG. 4 is a schematic block diagram of a second embodiment of the invention, showing an architecture for multi-band AAA in which a respective Active Feeding Network is employed to distribute and multiplex/demultiplex the transmit/receive RF signals of m RF transceivers (each of them operating at a different band) to/from M wideband antenna elements.

In FIGS. 3 and 4, an AAA supports m bands, while an antenna panel is composed of N radiating or antenna elements 201 . . . 20N. According to the AAA architecture, the N antenna elements are grouped in (N/M) sets or groups 30 of M elements 201 . . . 20M, 20M+1 . . . 202M, etc. (for this reason the modulus of N/M should be zero). Then, each of these groups 30 is fed by either a passive (FIG. 3) network 321 . . . 32(N/M) or active feeding network (FIG. 4) 341 . . . 34(N/M). (Passive and active feeding networks are characterized by phase shifting devices in the networks being active or passive in construction). The inputs of each feeding network 32 or 34 are respectively coupled to a set 221 . . . 22N/M of m RF transceivers 241 . . . 24m, each transceiver of a set designed to operate at one of the m different systems (bands) that are supported by the AAA. In the general case, the number of mobile telecommunication systems m supported by the AAA (and hence the number of independent transceivers that feed each feeding network) and the number of antenna elements M fed by the same feeding network are completely independent from each other, and it could be either smaller (m<M), equal (m=M) or larger (m>M).

Figure 5:
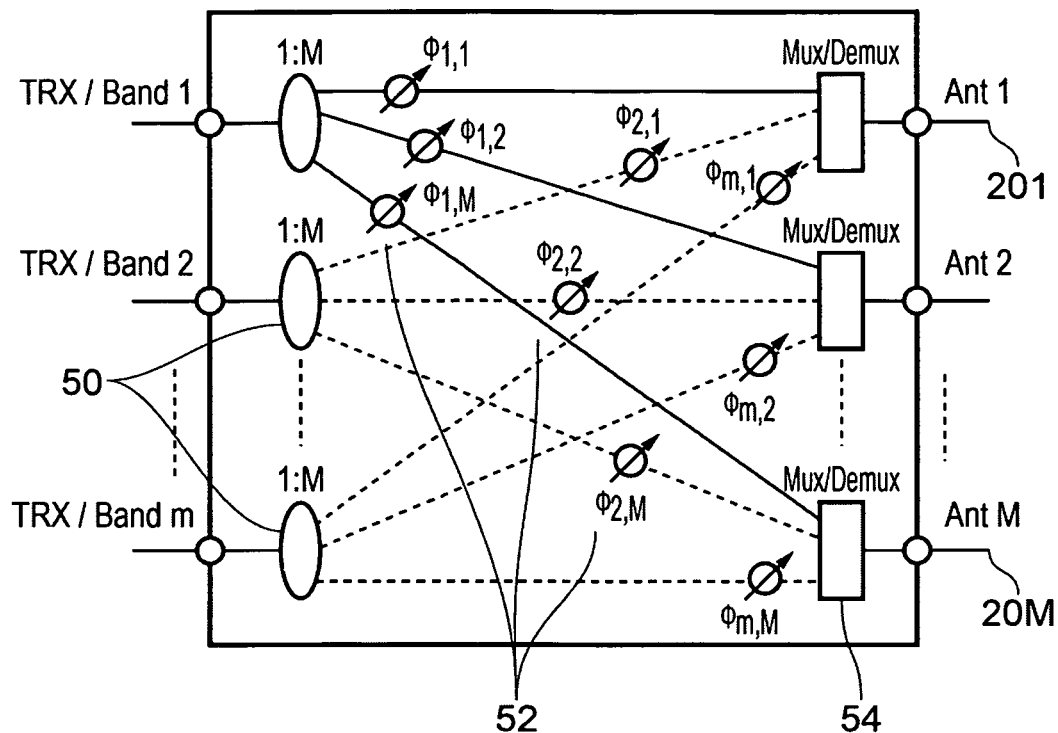
FIG. 5 is block diagram of the feeding network incorporated in the architectures of FIG. 3 and FIG. 4. Phase shifters $\Phi_{i,j}$ can be either passive (passive feeding network of FIG. 3) or active (passive feeding network of FIG. 4)

The functionality of the feeding networks 32, 34 is depicted in the block diagram of FIG. 5, which is a block diagram of a single feeding phase shifting network for both transmit signals and receive signals. For the case of downlink transmission (Tx-mode) from the base station, in the first stage of the feeding network the RF transmit signals of each of the m transceivers are divided in M copies by 1:M power dividers 50. Then, each copy is phase-shifted by an appropriate amount by a corresponding phase-shifter $\Phi_{i,j}$ 52. Finally, M multiplexers 54 are provided coupled to respective antenna elements 201 . . . 20M, and which receive a phase shifted signal from each power divider 50. Thus all the RF phase shifted signals (different bands) which are to be transmitted into the same antenna element are multiplexed before being fed in the wideband antenna element. In the case of uplink operation (Rx-mode) of the base station, the reciprocal functionality is implemented, in that multiplexers 54 function as demultiplexers for received signals, and power dividers 50 function as power combiners. It is important to note that all the components before the multiplexers are single-band components, the multiplexers are multi-band, and the antenna elements are the only components that have to be wideband.

The first RF components of the proposed passive or active feeding networks 32, 34 are the 1:M power divider/combiners. These are passive two-way components and could be either perfectly balanced or unbalanced, preferably implementing amplitude tapering for the antenna elements of the same group 30.

The phase-shifters $\Phi i,j$ 52 of the feeding network are used to maintain a certain phase progression per band across the antenna elements fed through the same feeding network (beam steering applications). In the general case of an AAA similar with that of FIG. 1 or FIG. 2, the phase-shift required (per band) between consecutive antenna elements to achieve a certain beam scanning angle would be set actively by N independent transceivers of the same band, This can be achieved e.g. by shifting the phase either in the digital domain of the transmitter or in the RF-section of the transmitter, The same is valid for the receive path. In the case of the architecture of FIGS. 3 and 4, there are only N/M independent transceivers per band that can maintain (in the digital domain or in the RF-section of the transceiver) the phase progression required to achieve a certain beam scanning angle. Given that each of these transceivers will feed M consecutive antenna elements, the phase-shifts that can be set by the independent transceivers should equal to M times the phase progression required between adjacent antenna elements to maintain a certain beam scanning angle. Then the phase-shifters $\Phi i,j$ 52 of the feeding network should be used to maintain the phase progression required between the consecutive antenna elements of the same group 30. In the case of a high-power AAA, employed in macro-cell deployments, in which the beam scanning requirements are limited (i.e. 0°-10° off-broadside) it can be shown that passive components such as passive microwave transmission lines, designed to provide a progressive phase-shift in the middle of the phase-shifts range required to achieve all the beam scanning angles needed, can provide an adequately good solution. In this case, the feeding network can be exclusively passive (FIG. 3), since power dividers and multiplexers are usually passive devices. Furthermore, in this case, the passive feeding network is a two-way microwave circuit and, therefore, a single network could be used both for the downlink (Tx) and the uplink (RX).

Nevertheless, in applications that require large beam scanning angles, such as AAA for small-cell deployments, multi-sector deployments etc, a passive solution for the phase-shifters is not adequate. Instead, the phase-shifters should be active (voltage controlled chips) and should be controlled by the transceivers of the bands that are feeding RF signals into the feeding network. In that case, the feeding network will be an active one (FIG. 4). It is noted that such active RF phase-shifters are usually lossy (e.g. <50% efficiency). Nevertheless, in the context of low-power AAA (of the order of 250 mW) such lossy components are not necessarily completely out of context. Finally, given that active RF phase-shifters are usually one-way devices, two feeding networks are required per group of antenna elements; one for downlink (Tx) and one for uplink (Rx).

As regards the RF multiplexers/demultiplexers of FIG. 5, the required operation of these devices is much dependent on the specific AAA architecture and the exact system configuration. In the most generic case that can be envisaged (all the bands under consideration feeding in the same antenna), these multiplexers/demultiplexers have to multiplex/demultiplex all the Tx and Rx RF signals of all the bands under consideration. For the case of an FDD (Frequency multiplex) system, in which the Tx and Rx signals are assigned on different frequency bands, this device should multiplex/demultiplex 2m different bands. Another approach could be that this device only multiplex/demultiplex the entire m bands of the multi-band AAA ('entire bands' meaning that both the Tx and Rx spectrum are included in the total spectrum of each multiplexed band). In that case, conventional duplexing devices would be required at the RF front-end (RF chains) of each of the bands for duplexing Tx and Rx signals (for the case of an FDD system). Nevertheless, other cases for the exact operation of the multiplexing devices can be also considered, depending on the exact AAA architecture. One such case will be discussed in the following example.

Figure 6:
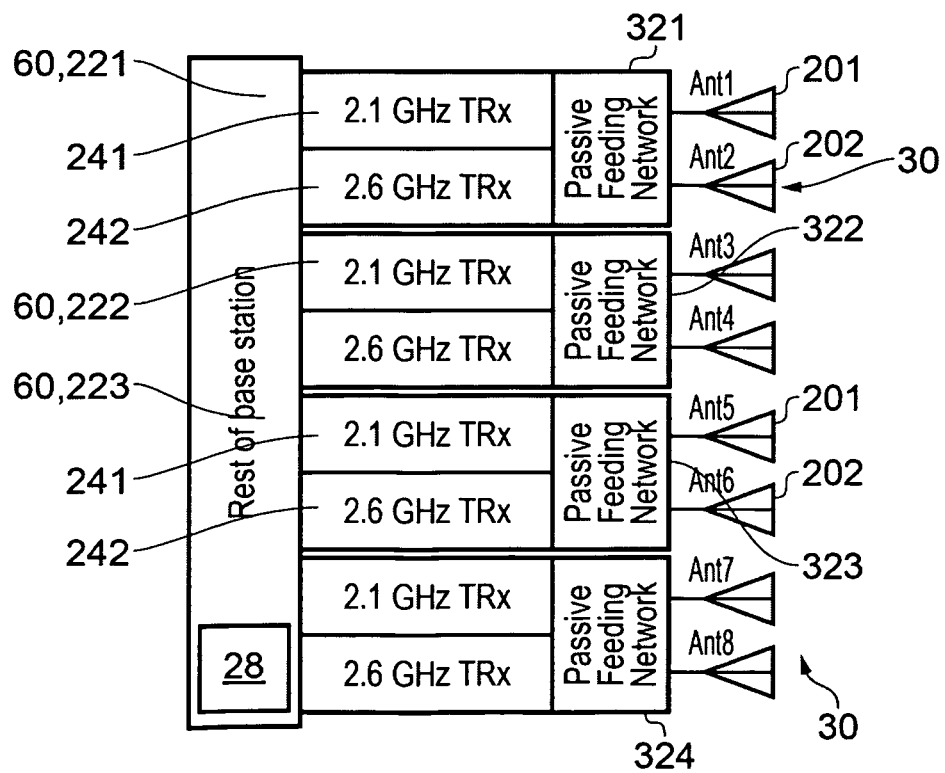
FIG. 6 is a schematic block diagram of a third embodiment, forming a specific example of a dual-band AAA of the present invention.

Referring to FIG. 6, an embodiment of dual band (m=2) AAA is presented. The two bands of interests are 2.1 GHz for UMTS deployment (DL: 2.11-2.17 GHz, UL: 1.92-1.98 GHz) and 2.6 GHz for LTE deployment (DL: 2.62-2.19 GHz, UL: 2.50-2.57 GHz). The AAA is composed of N=8 radiating elements (in the general case N should be any even number), while the antenna elements are grouped in pairs (M=2). For this specific case m=M. The employed radiating elements are wideband, dual-polarized, while one polarization(+45°) is employed for downlink transmission (Tx port/+45°) and the orthogonal(−45°) for uplink reception (Rx port) (this assumption has an impact on the operation of the multiplexing devices of the passive/active feeding network).

In FIG. 6, 4 modules 60 are each composed of a transceiver set 221224 comprising a pair of RF front-ends 241, 242 (one for 2.1 GHz and one for 2.6 GHz), a feeding and phase shifting network 321 . . . 324 and a pair of antenna elements 201,202 of each antenna group 30. For this implementation, block diagrams of each of these modules 60 are shown in FIG. 7 and FIG. 8, comprising downlink (Tx) and the uplink (Rx) circuits, respectively.

Figure 7:
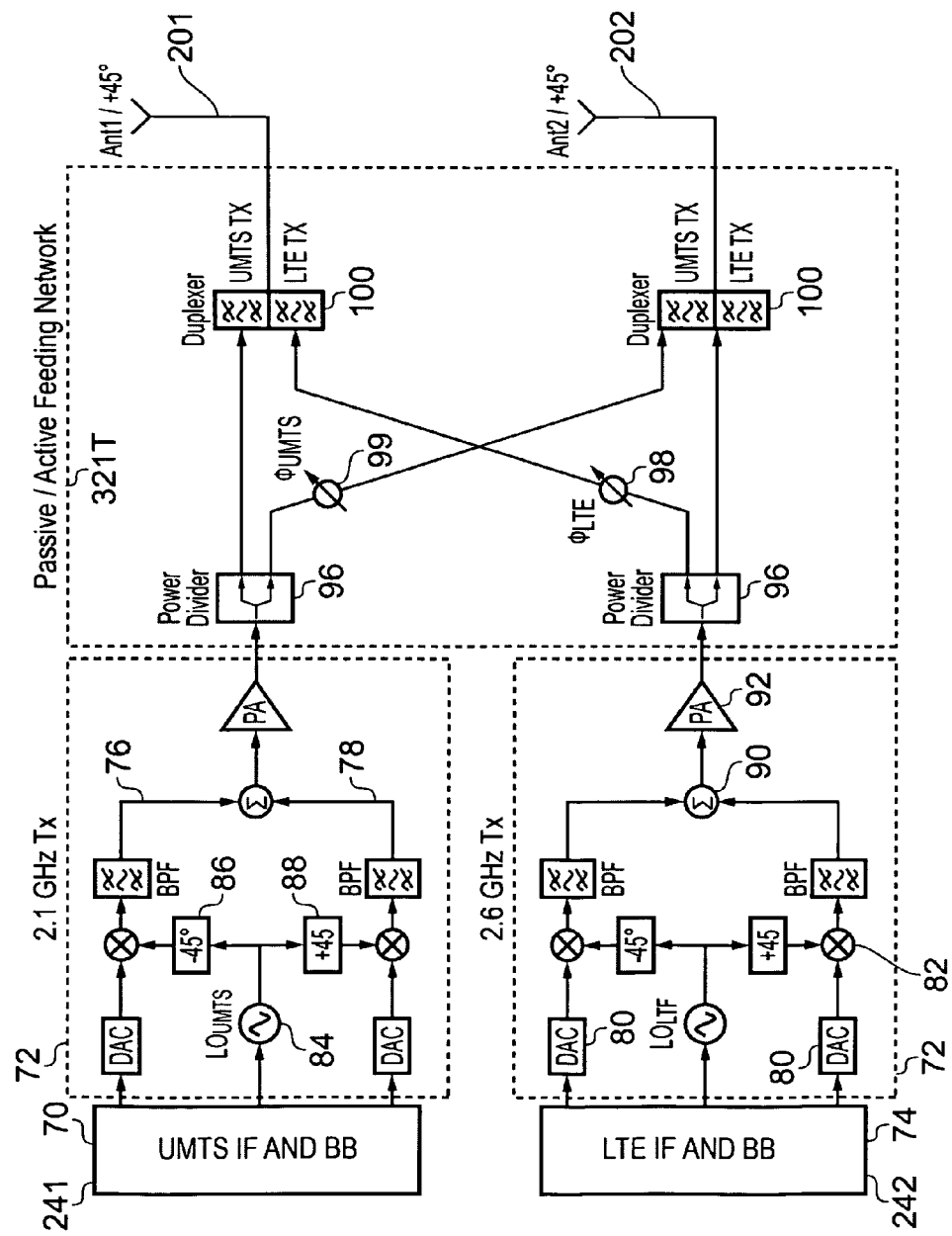
FIG. 7 is a block diagram of a module employed in the AAA of FIG. 6, for the case of downlink transmission (Tx), for coupling two transceiver elements operating on different bands to two antenna elements.

Referring to FIG. 7, transceiver 241 comprises a section 70 for UMTS IF and BB signals, followed by a transmitter section 72. Transceiver 242 comprises a section 74 for LTE IF and BB signals, followed by a transmitter section 72. Each transmitter section 72 comprises I and Q paths 76, 78, including DAC 80, multipliers 82, where the base band signal is multiplied by a phase shifted IF signal from LO 84, which is phase shifted at 86, 88. The IQ signals are combined at 90 and fed to a power amplifier 92.

In FIG. 7, the output of the two power amplifiers 92 (at 2.1 GHz (UMTS) and 2.6 GHz (LTE), respectively), without being filtered, are provided to a phase shifting transmit network 321T, where the outputs are divided at power dividers 96 and outputs thereof are appropriately phase-shifted in phase shifters 98, 99. Duplexers 100 receive signals from each power divider, and a combined signal from the two transceivers is fed from each duplexer to the appropriate antenna element 201,202. In this case each antenna element is a dual polarized antenna, and the output signal is applied to one of the two orthogonal polarizations of the antenna elements 201, 202, in this case the +45° input of antenna element 201, and the +45° input of antenna element 202.

Figure 8:
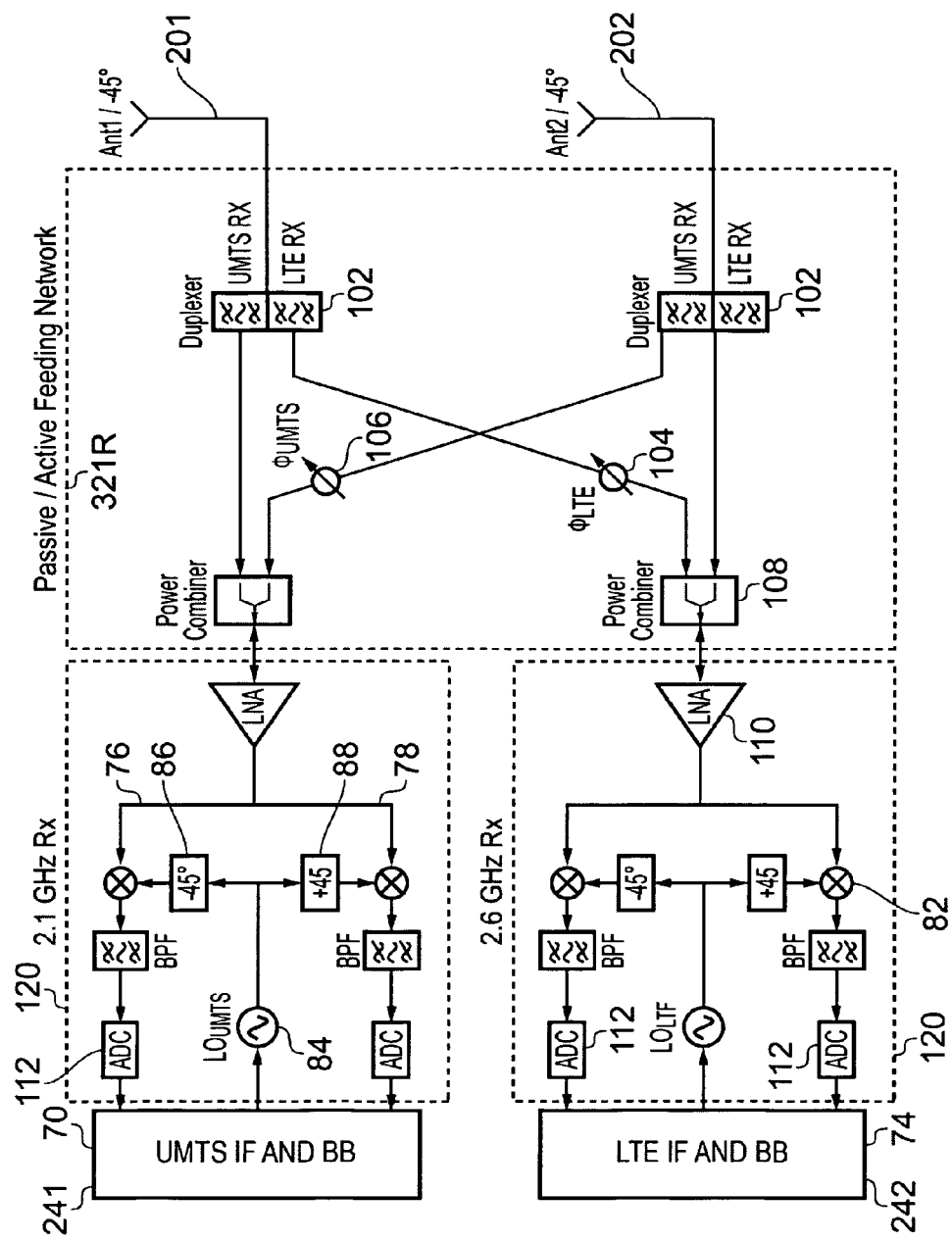
FIG. 8 is a block diagram similar to FIG. 7, for the case of uplink reception (Rx), for coupling two transceiver elements to two antenna elements.

For the case of uplink reception shown in FIG. 8, similar parts to those of FIG. 7 are denoted by the same reference numerals. Transmit sections 72 are replaced by receive sections 120, and the phase shifting network 321 is changed from a dividing and multiplexing function 321T to a demultiplexing and combining function 321R. The received signals at the polarization ports −45° of the two antenna elements 201,202 are demultiplexed at 102 by a reverse reciprocal process to that of FIG. 7, to the received signal at the 1.9 GHz (UMTS) band and that at the 2.5 GHz (LTE) band, then the signals are phase-shifted at 104, 106, and finally the signals of the same band are combined in power combiners 108 before being amplified at 110 in LNAs (low noise amplifiers) of each receiver 120 (depending on the exact system configuration the LNAs could be placed immediately after the demultiplexers). The output of each LNA is split into two IQ paths 76, 78, where the signals are converted to base band at 82, 84,86,88, and applied to ADCs 112.

Given that the Tx and Rx operations are considered on different antenna polarizations (and hence different antenna ports), the Tx feeding network is completely independent from the Rx feeding network. Nevertheless, the employed multiplexing/demultiplexing devices should also provide the required isolation between the Tx and the Rx signals of the same band. For example, the duplexing devices in FIG. 7 (downlink), apart from the isolation between the two Tx signals, should also provide the required isolation between the TX signals of both bands to the corresponding Rx signals. It is significant to note that such multiplexing units will receive downlink signals from different mobile telecommunication systems, that such demultiplexing units will receive uplink signals from different mobile telecommunication systems, and therefore these signals will be widely spaced in frequency. This therefore simplifies the construction of such units, since filtering requirements are reduced as compared with the common multiplexing situation, where all multiplexed signals are on the same frequency band.

Figure 9:
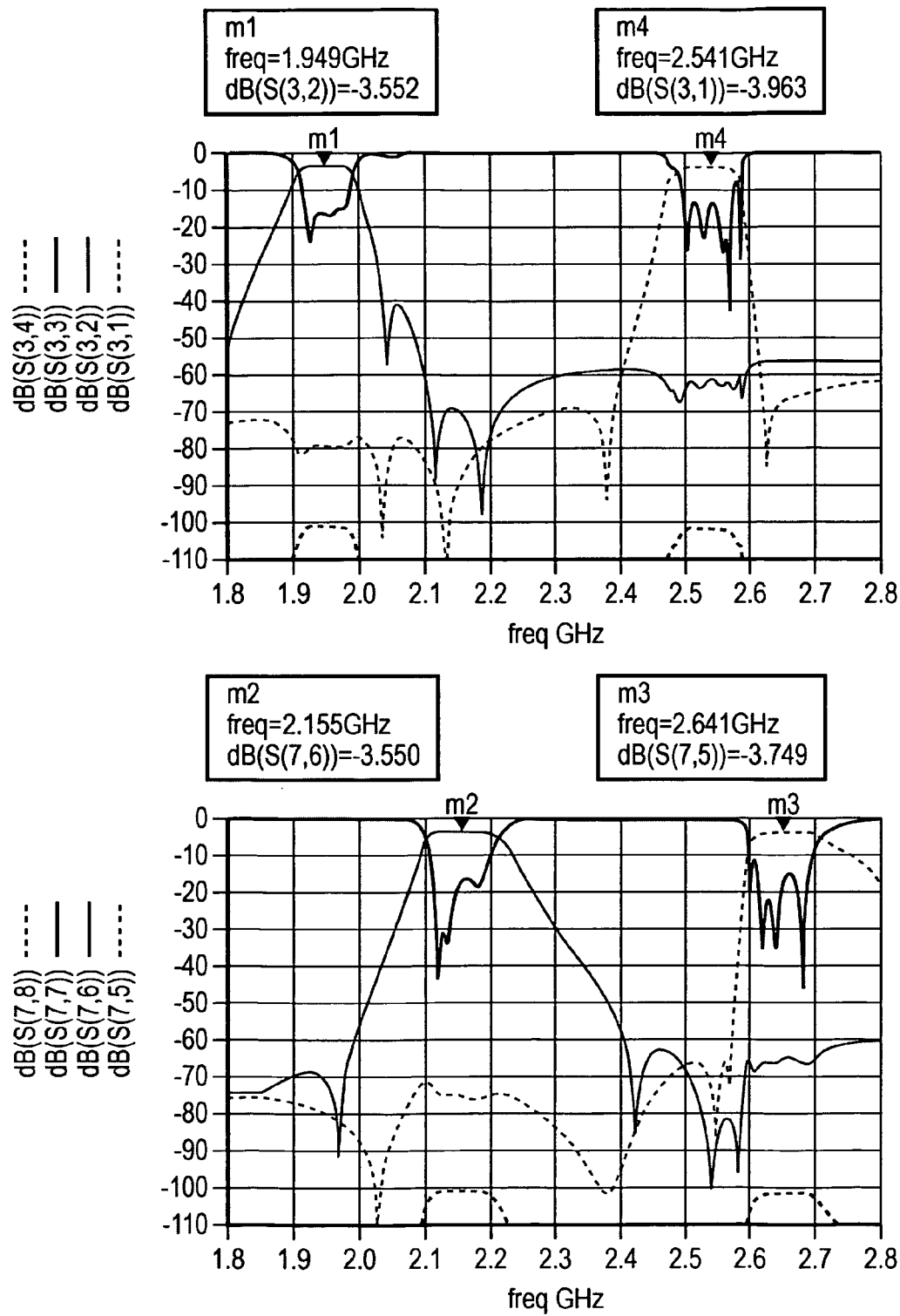
FIG. 9 comprises graphs showing simulated performance of the feeding network of FIGS. 7 and 8 for a receiving antenna port and a transmitting antenna port.

In order to manifest the aforementioned requirements, the results of the simulation of the passive feeding networks of FIG. 7 and FIG. 8 are presented in FIG. 9. For this simulation, all the power combiner/dividers, the phase-shifters and the duplexers are all designed as passive components. Specifically, regarding the duplexers, they are ceramic diplexers. Specifically, in FIG. 9, the performance (S-parameters) of the passive feeding networks of FIG. 8 (receiving antenna port) and FIG. 7 (transmitting antenna port), respectively, are presented. These results shown that, for example, at the downlink transmission case (FIG. 7) not only the Tx signals of the two bands are adequately isolated, but also good isolation between the UMTS Tx and Rx signals and the LTE Tx and Rx signals is achieved. Similar performance is achieved for the Rx cases.

An advantage of the above described embodiments is the design and implementation of multi-band or multi-system AAA with a reduced number of transceivers in order to reduce the weight, cost and complexity of the overall AAA.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. An antenna array, adapted for use with a plurality of different mobile telecommunications systems, comprising:
   a plurality of antenna elements, which are divided into a plurality of antenna groups, the groups comprising more than one antenna element;
   a plurality of feeding and phase shifting networks;
   wherein the antenna array is an active antenna array, and includes a plurality of transceivers, which are divided into a plurality of transceiver sets, the sets comprising more than one transceiver, and wherein the transceivers are configured to operate on a respective mobile telecommunications system of said plurality of different systems;
   wherein at least one transceiver set is coupled through a respective feeding and phase shifting network to a respective antenna group, so that the transceivers of the at least one transceiver set are coupled to the antenna elements of the respective antenna group in order to provide an active antenna array, generating a predetermined phase progression of antenna signal across adjacent elements of said plurality of antenna elements.

2. The active antenna array as claimed in claim 1, wherein selected members of the respective said transceiver set are coupled to each antenna element of the antenna group via a respective phase shifting device in order to generate said predetermined phase progression.

3. The active antenna array according to claim 1, wherein at least one transceiver set comprises two transceivers which serve a respective system of two systems, preferably a UMTS system and an LTE system, and at least one of said antenna groups comprises two antenna elements.

4. The active antenna array according to claim 1, wherein at least one phase shifting network includes an uplink path and a downlink path, and for the downlink path, one or more multiplexing devices, which are coupled to an antenna element to receive a plurality of downlink signals of different mobile phone systems from different transceivers of a said set.

5. The active antenna array according to claim 1, wherein at least one phase shifting network includes an uplink path and a downlink path, and for the uplink path, one or more multiplexing devices, which are coupled to an antenna element to feed a plurality of uplink signals of different mobile phone systems to different transceivers of a said set.

6. The active antenna array according to claim 4, wherein at least one phase shifting network includes a downlink path, which includes power dividers coupled to said transceivers, multiplexers coupled to said antenna elements, and phase shifting devices selectively coupled between said power dividers and multiplexers.

7. The active antenna array according to claim 5, wherein at least one phase shifting network includes an uplink path, which includes power combiners coupled to said transceivers, demultiplexers coupled to said antenna elements, and phase shifting devices selectively coupled between said power dividers and demultiplexers.

8. The active antenna array according to claim 1, wherein the phase shifting network includes active phase shifting devices, preferably integrated circuit elements.

9. The active antenna array according to claim 1, wherein the phase shifting network includes passive phase shifting devices, preferably transmission line lengths.

10. The active antenna array according to claim 1, wherein at least one of said antenna elements is a dual polarised antenna, wherein one polarisation is coupled to a transmit path of the respective transceivers, and the other polarisation is coupled to the receive path of the respective transceivers.

11. The active antenna array according to claim 1, wherein at least one of said antenna elements is sufficiently wideband to cover at least part of operating frequencies of said plurality of different systems.

\* \* \* \* \*